United States Patent Office 3,849,367
Patented Nov. 19, 1974

3,849,367
FLEXIBLE POLYESTER BASED SEALING COMPOSITION
James F. Mayer, Hinsdale, and Victor V. Raimondi, Naperville, Ill., assignors to Standard Oil Company, Chicago, Ill.
No Drawing. Filed Feb. 1, 1971, Ser. No. 111,755
Int. Cl. C08g 51/04
U.S. Cl. 260—40 R                    9 Claims

ABSTRACT OF THE DISCLOSURE

A flexible sealing composition is formulated from a resin and a filler. The filler is a refractory inorganic oxide such as hydrated aluminum oxide or aluminum silicate. The resin comprises an unsaturated polyester and a monomer. The polyester is the condensation polymerization product of an aromatic dicarboxylic acid, a saturated aliphatic dicarboxylic acid, an unsaturated aliphatic dicarboxylic acid, and long-chained diols. The monomer may be a vinyl alkenylbenzene or an acrylate.

BACKGROUND OF THE INVENTION

This invention relates to a composition whose unique characteristics make it suitable for use as caulks and sealants in a wide variety of industrial applications. More specifically, the invention relates to an elastomeric composition containing a resin, which is a combination of an unsaturated polyester polymer and a hydrocarbon monomer, and a refractory inorganic oxide filler. This composition exhibits excellent properties which are ideally suited for caulk and sealant applications in the automotive, architectural, and related industries.

In the automotive industry, sealants and caulks are typically used for such applications as windshield sealants, body patching materials, and weld-through and vinyl drip rail sealants. In the architectural industry caulks are widely used as expansion joint sealants. A sealing composition should be soft and flexible at low temperature while resistant to cracking and hardening at high temperature. At ambient conditions it must have the proper balance of elongation and tensile strength but still be soft and flexible. Finally, the sealing composition must readily adhere substrates and resist fatigue and weathering.

In the past the automotive industry has employed polybutene based sealant compositions, curable polysulfide sealant compositions, and butyl based tape sealants for the automobile windshield application. Architectural expansion joint sealants have typically been polysulfide, oleo-resinous, or polybutene based sealing compositions. Most recently, the polysulfide types have been widely used in both industries. However, all of the above mentioned sealant types are relatively expensive. Consequently, the lower cost compositions exhibiting the desired sealant properties would be economically attractive.

DESCRIPTION OF THE INVENTION

The polyester based sealant composition of the present application is a lower cost substitute for the above mentioned sealants. Generally, the main components of the composition comprise from 20 to 90 parts by weight of a resin and from 10 to 80 parts by weight of a filler. Advantageously from 25 to 85 parts by weight of the resin and 15 to 75 parts by weight of filler are used while the preferred ranges are respectively 60 to 80 parts by weight and 20 to 40 parts by weight. A particular caulk or sealant application will require a specific combination of properties. In particular, the sealant compositions used in the automotive and architectural fields could possess the following properties:

1. A Shore-A hardness in the range of 15 to 60 at ambient temperatures.
2. A tensile strength of 100 to 300 p.s.i. with a maximum elongation of 100 to 450% at room temperature.
3. Good softness and flexibility at −20° F.
4. Good adhesion to substrates such as steel, glass, aluminum, masonry, and the like.
5. Good fatigue and weather resistance.
6. Resistance to further aging and cracking at temperatures above ambient.

The polyester based compositions heretofore formulated have not possessed this combination of properties. One problem has been the inability to formulate a polyester having the proper balance between tensile strength, elongation strength, flexibility and softness.

Cross-linking between the polymer chains is necessary to obtain the proper tensile strength, elongation strength, and aging characteristics. However, generally the flexibility and softness is adversely affected by cross-linking. Normally greater flexibility and softness is obtainable but only at the expense of mechanical strength. Up to now, the practice has been to modify a rigid polymer, which has the desired tensile and elongation properties, with a plasticizer. The effect of the plasticizer is to soften the polymer and make it more flexible while still retaining the mechanical strength properties. However, there are inherent disadvantages in this approach. Substantial amounts of plasticizer are required; as much as 20 to 50 wt. percent of the polymer. These plasticizers, in turn, have a tendency to bleed out of the composition which results in a reversion to the undesired hardness and stiffness characteristics. Higher temperatures tend to speed up this bleed out process. Consequently, this approach has not gained wide acceptance. We have overcome these difficulties and invented a polyester based sealant composition wherein the resin requires little, if any, external plasticization but has the proper balance between tensile strength, elongation strength, softness, and flexibility.

By itself, the resin does not meet all the requirements for an acceptable sealing composition. We have found that with the proper choice of type and amount of filler material, an acceptable sealing composition may be obtained. Operating within the ranges previously specified, the addition of refractory inorganic oxides will impart to the composition enhanced handling, pH control, adhesion, and tack characteristics. Good handling properties are required for ease in application to a substrate. Ideally a sealant should be fluid when being mechanically worked into the desired form, and then rapidly set up. pH control is important in the formulation process. The composition should remain acidic and the fillers employed help maintain this acid character. As heretofore mentioned good adhesion of the sealant to the substrate is necessary. Tackiness during application is not desirable. A tacky sealant will stick to the sealant applying means resulting in wasteful, sloppy, and inefficient operations. All of the above properties are improved by the addition of the refractory inorganic oxide fillers of our invention. Aluminum silicates, commonly sold under the trade name of Dixie Clay or Al-si-late-lo are preferred. Hydrated aluminum oxide is also preferred. A pyrogenic silica (known as Cab-O-Sil) may be used to replace up to 8 parts by weight of the aluminum silicate. Mixtures of the various inorganic oxides are acceptable.

The resin component of the composition in general consists of from 55 to 95 parts by weight of an unsaturated polyester and from 5 to 45 parts by weight of a hydrocarbon monomer. Advantageously 60 to 90 parts by weight of the polymer and 10 to 40 parts by weight of the monomer may be used while preferably 70 to 85 parts by weight and 5 to 30 parts by weight are respectively used.

In its cured form the resin is very soft, yet has the toughness and strength required. This is unusual since cross-linked polyesters are normally very hard. Even highly flexible cross-linked polyesters are harder than is acceptable for specific sealing applications. The cured resin of our invention is like a soft rubber and stays soft even after accelerated aging. The polyesters commonly known to the art have not had the necessary combination of toughness and strength within softness and flexibility levels desired.

The unsaturated polyester polymer is the condensation product of an aromatic dicarboxylic acid, a saturated aliphatic dicarboxylic acid, long-chained diols, and an unsaturated aliphatic dicarboxylic acid. The aromatic dicarboxylic acid is required to achieve the necessary toughness. Toughness implies the desired level of both tensile and elongation strength. Such properties impart to the polymer improved tear strength resistance. Isophthalic acid, terephthalic acid or phthalic anhydride may be preferably employed. The saturated aliphatic dicarboxylic acid and long-chained diols are necessary to achieve the required softness at low temperatures. Without these components the polymer would become hard and brittle at low temperatures. They promote the *permanent* softness and flexibility by internal plasticization, that is plasticization derived from the character of the polymer chain itself. On the other hand, external plasticization, which may be required only in minor amounts in our composition, if at all, implies that additives remain suspended in but not chemically linked to the polymer composition. We believe that a major advantage of our invention is this permanent softness and flexibility caused by the internal plasticization. Representative saturated aliphatic dicarboxylic acids which may be used are adipic acid, azaleic acid, and sebacic acid. The preferred long-chained glycols are triethylene glycol or diethylene glycol. Commonly known short-chained glycols such as ethylene glycol and propylene glycol are not acceptable. The unsaturated aliphatic dicarboxylic acid is necessary to promote cross-linking within the polymer. Maleic anhydride or fumaric acid are preferred.

In formulating the composition the following amounts may be used: 1 to 3 moles of aromatic dicarboxylic acid per mole of unsaturated aliphatic dicarboxylic acid, 4 to 9 moles of saturated aliphatic dicarboxylic acid per mole of unsaturated aliphatic dicarboxylic acid, and sufficient long-chained glycols to have a ½ to 3 mole percent excess of long-chained glycols over all carboxylic acid groups present. Preferably the above composition ranges may be 1.5 to 2.5, 5 to 7, and ¾ to 2 respectively.

The monomer component of the resin is another variable to be considered in obtaining the optimum final properties. The monomer is used to cross-link the polymer which helps obtain the desired tensile and elongation strength. However, it is important not to add an excessive amount of the monomer otherwise the final composition may be too hard and require excessive external plasticization. Also, the choice of monomer will effect the ultimate properties obtained. It is possible to add 5 to 45 parts by weight to the polymer. Advantageously 10 to 40 parts by weight may be used while 15 to 30 parts by weight is preferred. A vinyl alkenylbenzene such as styrene may be used as the monomer. Also, an acrylate monomer, such as ethylacrylate, may be employed along with the vinyl alkenylbenzene monomer at a concentration of from 1 to 80 wt. percent (based on the vinyl alkenylbenzene monomer). Advantageously, 15 to 70 wt. percent of the second monomer may be used while 33 to 67 wt. percent is preferred.

If an external plasticizer is required to lend additional softness and flexibility to the composition, it need be added at a concentration of no greater than 8 parts by weight of the total composition. With such a low level of external plasticization, the deleterious effects of the plasticizer bleed out problem are minimized. Other conventional additives may also be incorporated into the composition. A catalyst is required for the cross-linking reaction between the unsaturated polymer and the monomer. This is commonly known as curing. Inhibitors, which increase the shelf stability of an uncured resin, are also desirable. These inhibitors suppress the cross-linking reaction during storage. In certain applications, the tack characteristics of the final composition are improved by the use of additives such as a solution of a paraffin wax in styrene.

The following specific embodiments of the invention will be helpful in obtaining an understanding of the invention, but are not to be construed as unduly limiting the scope thereof.

EXAMPLE I

An unsaturated polyester polymer was prepared from the following components:

| Ingredient: | Moles |
|---|---|
| Maleic Anhydride | 1.0 |
| Isophthalic Acid | 2.0 |
| Adipic Acid | 6.0 |
| Diethylene Glycol | 1.8 |
| Triethylene Glycol | 7.3 |

The polymer was prepared in a two stage process. The isophthalic acid, adipic acid, and glycols were charged to a kettle and reacted at a maximum temperature of 450° F. for approximately 10 hours to an acid number of 20 to 30. The maleic anhydride was then charged to the mixture and reacted at a maximum temperature of 450° F. to a final acid number of approximately 35. This required an additional 6 hours of reaction time.

EXAMPLE II

A sealant composition was formulated from the following components:

| | Parts by Weight |
|---|---|
| Polyester Polymer Prepared in Example I | 70 |
| Styrene Monomer | 15 |
| Ethyl Acrylate Monomer | 15 |
| Hydroquinone | .06 |
| Aluminum Silicate (Dixie Clay) | 20.0 |
| Pyrogenic Silica (Cab-O-Sil) | 5.0 |
| Diethyl Aniline | 0.25 |
| Cobalt Octoate, 12% Solution | 0.30 |
| Methyl Ethyl Ketone Peroxide | 1.5 |

(Polyester Polymer + Styrene + Ethyl Acrylate + Hydroquinone = 70)

EXAMPLE III

Another sealant composition was prepared from the following components:

| | Parts by Weight |
|---|---|
| Polyester Polymer Prepared in Example I | 70 |
| Styrene Monomer | 30 |
| Hydroquinone | .06 |
| Chlorinated Paraffins (Diablo 700-X) | 4.5 |
| Trichloro ethyl phosphate | 1.5 |
| Aluminum Silicate (Dixie Clay) | 20.0 |
| Pyrogenic Silica (Cab-O-Sil) | 5.0 |
| Wax Solution | 0.5 |
| Diethyl aniline | 0.25 |
| Cobalt Octoate, 12% Solution | 0.30 |
| Methyl Ethyl Ketone Peroxide | 1.5 |

(Polyester Polymer + Styrene + Hydroquinone = 70)

The wax solution employed in Example III consisted of the following components:

| | Wt. percent |
|---|---|
| Spermacetti Wax | 6 |
| Cobalt Octoate | 1 |
| Styrene Monomer | 93 |

This solution was added to impart tack free characteristics to the composition. The hydroquinone used in Examples II and III, was employed as an inhibitor to improve the shelf stability of the sealant. In Examples II and III, the diethyl aniline, cobalt octoate, and methyl ethyl ketone peroxide combination acted as a curing agent. The chlorinated paraffins and trichloroethylphosphate in Example III acted as an external plasticizing agent.

The above formulations were prepared by thoroughly blending the polymer, monomer, and plasticizers in a conventional agitation apparatus. The fillers were then added to the blend by stirring. The mixture was then milled at 60 to 65° F. in a 3-roll laboratory paint mill. To insure an intimate dispersion of the fillers into the blend, at least three passes were made in the mill after the final filler additions. Finally, the cure systems were added by stirring just prior to the application.

The sealant formulations were evaluated by accepted industry test methods. Adhesion was subjectively measured by first extruding a ¼" x 6" bead on the indicated substrate and aging. One end of the bead was turned 180° and pulled along the bond line. If all breaks were cohesive with no loss of adhesion to the substrate, the sealant was passed. The adhesion, aging, and weathering properties were evaluated in a Weather-Ometer instrument manufactured by the Atlas Electric Devices Co. This machine subjected adhesion test samples to Xenon lamp radiation at about 145° F. and 50% relative humidity (R.H.) for 100 hours. This exposure simulated high temperature aging in bright sunlight. Low temperature flexibility was evaluated by extruding a ⅜" x 6" bead on a steel panel, aging it two days, holding it at −20° F. for 24 hours, then bending the same sample around a ⅛" conical mandrel. Tensile strength and elongation tests were performed on 75 mil type "C" dumbbells with a gauge length of one inch (ASTM–D–412). The fatigue resistance test consisted of first bonding tempered glass to an acrylic coated steel with the sealant. Both substrate surfaces were primed. After aging two days the assembly was vibrated under water at 400–600 cycles/min. and an amplitude of 30–60 mils. The sample failed if any seepage through the sealant or the bonds occurred within 300,000 cycles. This test is a modification of procedures used by Ford and Chrysler. The test results are presented in the following table.

What we claim is:

1. A flexible sealing composition which comprises from 20 to 90 parts by weight of a resin and from 10 to 80 parts by weight of a refractory inorganic oxide filler, said resin comprising from 55 to 95 parts by weight of an unsaturated polyester polymer and from 5 to 45 parts by weight of a hydrocarbon monomer, said cross-linked polyester polymer comprising the condensation product of the following components:

a. An aromatic dicarboxylic acid selected from the group consisting of isophthalic acid, terephthalic acid, and phthalic acid;

b. A saturated aliphatic dicarboxylic acid selected from the group consisting of adipic acid, azaleic acid, and sebacic acid;

c. A long-chained diol selected from the group consisting of triethylene glycol, diethylene glycol, or a mixture of triethylene glycol and diethylene glycol; and d. An unsaturated aliphatic dicarboxylic acid selected from the group consisting of fumaric acid and maleic anhydride, wherein said aromatic dicarboxylic acid is employed in the range of 1 to 3 moles per mole of said unsaturated aliphatic dicarboxylic acid, said saturated aliphatic dicarboxylic acid is employed in the range of 4 to 9 moles per mole of said unsaturated aliphatic dicarboxylic acid, and said long-chain glycols are employed in an amount sufficient to give a ½ to 3 mole percent excess over the carboxyl groups present, and wherein said hydrocarbon monomer is selected from the group consisting of a vinylalkenylbenzene, an acrylate, or a mixture of said vinylalkenylbenzene and said acrylate, said mixture containing 1 to 80 weight percent of said acrylate, said flexible sealing composition having a Shore hardness less than 80, and a tensile strength in the range of 100 to 200 p.s.i.

2. The flexible sealing composition of Claim 1 wherein said refractory inorganic oxide filler is selected from the

EVALUATION OF FLEXIBLE POLYESTER BASED SEALING COMPOSITIONS

| | Example II | | Example III | |
|---|---|---|---|---|
| | Primed* | Unprimed | Primed* | Unprimed |
| Properties after 2 days at 73° F. and 50% relative humidity (R.H.): | | | | |
| Adhesion characteristics: | | | | |
| Cold rolled steel | Excellent | Not consistently good | Good | Fair to poor. |
| Stainless steel | do | Excellent | do | Do. |
| Glass | do | Not consistently good. | do | Do. |
| Aluminum (anodized) | do | Excellent | do | Do. |
| Concrete | Good | Good | do | Do. |
| Shore-A hardness (2 days) | | 40–45 | | 55 |
| Properties after 100 hours Weather-Ometer exposure: | | | | |
| Adhesion characteristics | Same as above except for poor adhesion to concrete | | | |
| Shore-A hardness | | 25–35 | | 50 |
| Physical properties: | | | | |
| Tensile strength, p.s.i. | | 119 | | 168 |
| Elongation, percent | | 407 | | 138 |
| Modified Chrysler fatigue resistance test | 406,000 cycles at 650 cycles/min. on primed and unprimed substrates.—Considered passing. | | Over 300,000 cycles at 400 cycles/min. on primed and unprimed substrates.—Considered passing. | |
| Low temp. flexibility (−20° F.) | No cracking or loss of adhesion | | No cracking or loss of adhesion | |

*All substrates primed with hydrolyzed gamma methacryloxy propyl trimethoxy silicane.

These test results demonstrate that our flexible composition is well suited for industrial sealing applications. The elongation and tensile strengths are well within the limits specified. The Shore-A hardness in both cases is below the maximum limit of 60. Even after accelerated Weather-Ometer aging, the softness is still retained. The adhesion characteristics of freshly cured material are acceptable by industry standards. With the exception of concrete, these adhesion characteristics are retained after aging. The low temperature flexibility test shows no loss of adhesion or cracking. Finally, both samples pass the fatigue resistance test.

group consisting of aluminum silicate and hydrated aluminum oxide.

3. The flexible sealing composition of Claim 2 wherein said refractory inorganic oxide filler contains up to 8 parts by weight of pyrogenic silica.

4. The flexible sealing composition of Claim 1 wherein said vinylalkenylbenzene is styrene.

5. The flexible sealing composition of Claim 1 wherein said acrylate is ethylacrylate.

6. The flexible sealing composition of Claim 1 wherein said mixture consists of styrene and ethylacrylate.

7. The flexible sealing composition of Claim 1 containing no greater than 8 parts by weight of an external plasticizing agent.

8. An article of manufacture comprising a substrate in intimate contact with the flexible sealing composition described in Claim 1.

9. The article of manufacture of Claim 8 wherein said flexible sealing composition contains no more than 8 parts by weight of an external plasticizer.

References Cited

UNITED STATES PATENTS

| | | | |
|---|---|---|---|
| 2,879,323 | 3/1959 | Nichols et al. | 260—861 X |
| 3,091,936 | 6/1963 | Lundberg et al. | 260—863 X |
| 3,563,939 | 2/1971 | Stevens et al. | 260—40 R X |
| 3,591,191 | 7/1971 | Coderre et al. | 260—861 X |

OTHER REFERENCES

Oleesky et al.: *Handbook of Reinforced Plastics*, Reinhold (1964), New York, pp. 212, 250.

J. Bjorksten: *Polyesters and Their Applications*, Reinhold (1964), New York, pp. 212, 250.

ALLAN LIEBERMAN, Primary Examiner

S. M. PERSON, Assistant Examiner

U.S. Cl. X.R.

260—861